United States Patent [19]
Kaltenegger

[11] 3,763,944
[45] Oct. 9, 1973

[54] STEERING TRANSMISSION MECHANISM AND VEHICLES WITH RIGIDLY MOUNTED AXLES INCORPORATING SAID MECHANISM

[76] Inventor: Benno Kaltenegger, Kurhausstr. 77-79 5202, Hennef, Sieg, Germany

[22] Filed: Feb. 23, 1972

[21] Appl. No.: 228,678

[30] Foreign Application Priority Data
Feb. 26, 1971 Germany.................. P 21 09 177.0
Feb. 26, 1971 Germany.................. P 21 09 120.3

[52] U.S. Cl.................... 180/6.2, 180/9.62, 180/20
[51] Int. Cl............................................. B62d 11/12
[58] Field of Search.............. 180/6.2, 6.66, 6.7, 180/9.62, 20

[56] References Cited
UNITED STATES PATENTS

| | | | |
|---|---|---|---|
| 3,017,941 | 1/1962 | Baker................................. | 180/6.2 |
| 2,124,708 | 7/1938 | Peter.................................. | 180/9.62 |
| 1,232,414 | 7/1917 | Wallis................................. | 180/20 |
| 2,337,255 | 12/1943 | LeTourneau..................... | 180/6.2 X |
| 2,866,360 | 12/1958 | Gerst et al........................ | 180/6.2 X |
| 2,999,553 | 9/1961 | Schwartz............................ | 180/6.7 |
| 3,195,429 | 7/1965 | Cowley.............................. | 180/20 X |

Primary Examiner—Benjamin Hersh
Assistant Examiner—Leslie J. Paperner
Attorney—Neil F. Markva et al.

[57] ABSTRACT

Vehicles of various types having rigidly mounted axles include a steering transmission mechanism comprising a plurality of shafts, gears and clutches capable of both driving and steering the vehicles. The plurality of clutches which may be selectively energized serve to interconnect selected gears with their supporting shafts to provide the left and right sets of wheels, tracks or rollers separately with power in either the forward or reverse directions at more than one speed.

6 Claims, 11 Drawing Figures

PATENTED OCT 9 1973　　　　　　　　　3,763,944

FORWARD

STEERING TRANSMISSION MECHANISM AND VEHICLES WITH RIGIDLY MOUNTED AXLES INCORPORATING SAID MECHANISM

SUMMARY OF THE INVENTION

This invention is directed to a steering transmission mechanism and to vehicles such as crawler tractors, rollers or the like having rigidly mounted axles which include the steering transmission mechanism.

Vehicles having drive wheels for crawler tracks or functional purposes such as compacting rollers usually are arranged so that their axles are rigidly mounted on the frame of the vehicle. With this arrangement, it is not possible to swivel or pivot the wehels with respect to the vehicle for the purpose of steering in the conventional manner. In addition, the rigidly mounted drive wheels or rollers are usually disposed in pairs on each side of the frame. Each pair of wheels is thus arranged in tandem, one behind the other, in the direction of travel. The pairs of wheels on opposite sides of the vehicle are adapted to be driven either jointly or independently. Commonly, with this arrangement, separate reversing gear mechanisms and drive transmissions are provided with each pair of wheels or rollers so that each pair may be driven independently of the other. With this arrangement each pair can be driven at a selected forward speed or reverse speed or can be disengaged to freely rotate. With each pair of wheels or rollers being controlled separately, the vehicle can be caused to follow a curved path or even rotated "on the spot."

The conventional drive mechanism for a vehicle of this type therefore requires a considerable amount of space in the vehicle. In addition, it is not possible to cause the vehicle to travel along a curved path while maintaining optimum control, since with this arrangement, normally only one pair of wheels or rollers will be driven while the other pair is not driven or may even be braked. Thus, one track, pair of wheels or pair of rollers located on the inside of the curve is permitted or required to slip or slide. When sudden changes in direction take place, this characteristic will in many cases tear up or gouge the road surface which is undesirable, particularly in the case of a roller vehicle designed to smooth or compact a surface.

OBJECTS OF THE INVENTION

It is an object of this invention to provide a steering transmission for vehicles having rigidly mounted axles wherein a single transmission unit which is extremely compact is arranged to perform all of the necessary functions for both driving and steering the vehicle in both forward and reverse directions.

It is another object of this invention to provide a transmission for a vehicle having rigidly mounted axles which includes only spur gears which remain permanently meshed and do not require engaging or disengaging or sliding in order to change speed or direction of the vehicle.

A still further object of this invention is to provide a vehicle having rigidly mounted axles with a transmission which permits the wheels, rollers or tracks of the vehicle to be continuously driven while the vehicle is in motion so that none of the drive wheels, rollers or tracks are allowed to slide or slip on the supporting surface while the vehicle is following a curved path.

Another object of the invention is to provide a transmission for a vehicle having rigidly mounted axles which does not include a differential, thus permitting the vehicle to travel along a curved path while constraining the wheels, tracks or rollers in a controlled manner.

A still further object of this invention is to provide a steering transmission mechanism having separate output shafts which are independently controlled for speed and direction of rotation so that the drive shafts on each side of a vehicle may be controlled selectively and independently in order that the vehicle may be made highly maneuverable.

A still further object of the invention is to provide a steering transmission mechanism requiring a simple and reliable control mechanism for controlling operation of a vehicle.

SUMMARY OF THE INVENTION

An extremely compact power transmission unit mounted on a vehicle is coupled to the drive shaft of an engine. The transmission has a plurality of arranged gears and shafts which provides a split transmission train for dividing the input power and delivering it to separate output drive shafts, each output drive shaft being coupled to the wheels, track or rollers on one side of the vehicle. Only spur gears are used throughout the transmission which are permanently meshed, eliminating the necessity for engaging and disengaging the gears. Instead, clutches, preferably of the hydraulic type which are conveniently controlled by the application and release of hydraulic pressure, are mounted within the transmission and arranged to interconnect selected gears with their rotational support shafts. It is thus possible through engagement of the appropriate coupling or clutch to drive either output shaft at a selected speed in either a forward or reverse direction. A pair of clutches wherein one performs a forward function and the other a reverse function can be mounted on the same shaft so that the meshed gear train for the desired function can be connected to the particular drive shaft when desired. In the case of hydraulically operated clutches, a hydraulic pump is directly connected to the input drive shaft of the transmission providing a continuous source of hydraulic pressure. A hydraulic valve is located in each conduit line to each hydraulic clutch to control the engagement and disengagement of each clutch. Conveniently, a two-way valve shaft can be used for controlling a pair of clutches mounted on a single shaft since only a single function for the shaft will be required at any one time. In this way, only half the usual number of control valves is required.

By proper manipulation of the control valves, the pairs of wheels, tracks or rollers on each side of the vehicle can be operated jointly or independently as desired. Thus, the vehicle can move in a forward or reverse direction at a predetermined speed. By independently controlling each track or each pair of wheels or rollers, the vehicle can be turned "on the spot" or driven along a curved path either in the forward or reverse direction. All the travel movements of a vehicle of this design are constrainedly controlled so that the steering of the vehicle, particularly when traveling on curves, can be effected in an unequivocally defined manner. A road roller vehicle of this design is especially suitable for use on sporting grounds having a plurality of arcuate tracks. It is thus possible to roll a curved track evenly without it being necessary to effect sudden and sometimes erratic controls.

BRIEF DESCRIPTION OF DRAWINGS

Other features of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
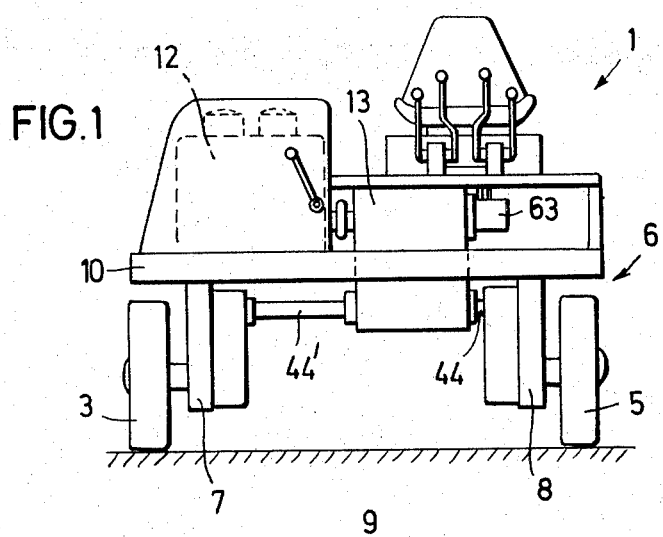
FIG. 1 shows a front elevation view in diagrammatic form of a vehicle incorporating the steering transmission of the present invention.
Figure 2:
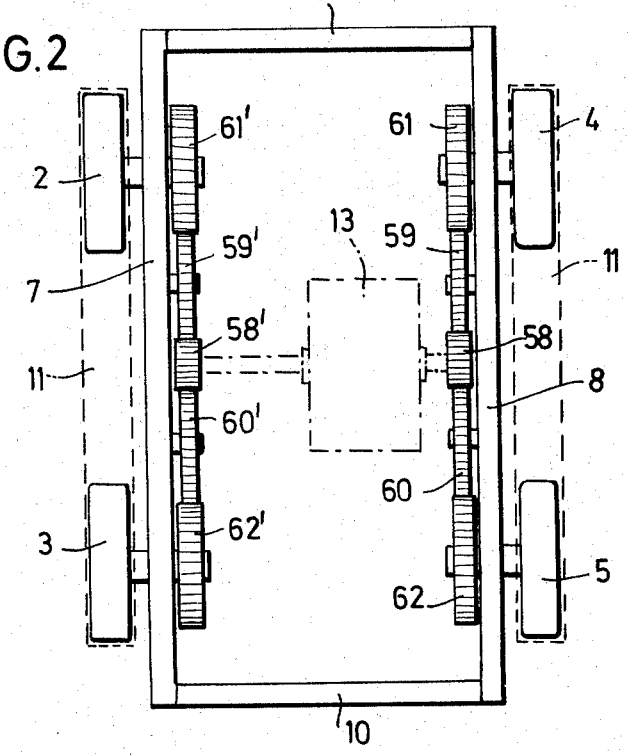
FIG. 2 is a plan view in a diagrammatic form of the vehicle of FIG. 1.

As illustrated in FIGS. 1 and 2, a vehicle 1 is shown having four wheels 2, 3, 4 and 5 used as drive wheels for traveling or propelling the vehicle over a surface. The wheels are disposed in pairs on each side of the vehicle with the individual wheels in the pairs located in tandem or longitudinal alignment. The wheel pairs 2, 3 and 4, 5 are mounted rigidly on the frame 6. The frame 6 includes the side rails 7, 8 and the transverse spars or cross members 9, 10. If desired, the vehicle 1 may be of the crawler track type wherein tracks 11, 11' are disposed in endless arrangement around the respective drive wheels on each side of the vehicle (FIG. 2). Thus, with this latter arrangement the wheel pairs 2, 3 and 4, 5 do not come directly in contact with the surface but ride within and drive the endless tracks 11, 11'. Each wheel in the pair is driven jointly with the other so that the wheel pair acts as a unit and moves together.

Intermediate gear trains 58, 59, 60, 61, 62 and 58', 59', 60', 61', 62' are mounted on their respective sides 7, 8 of the vehicle 1 each interconnecting and driving a pair of wheels.

Mounting on the vehicle 1 is a drive engine 12 which is interconnected by a coupling to the steering transmission 13. In this embodiment both the engine and the transmission apparatus are mounted in a generally central position on the vehicle. The output shafts 44, 44' of the transmission are thus generally aligned with the drive pinion gears 58, 58' for the wheel pairs 2, 3 and 4, 5.

By means of the steering transmission, independent and controlled drive to the wheel pair on each side of the vehicle can be obtained. Thus, the vehicle can be driven in either the forward or reverse direction at various speeds.

Figure 3:
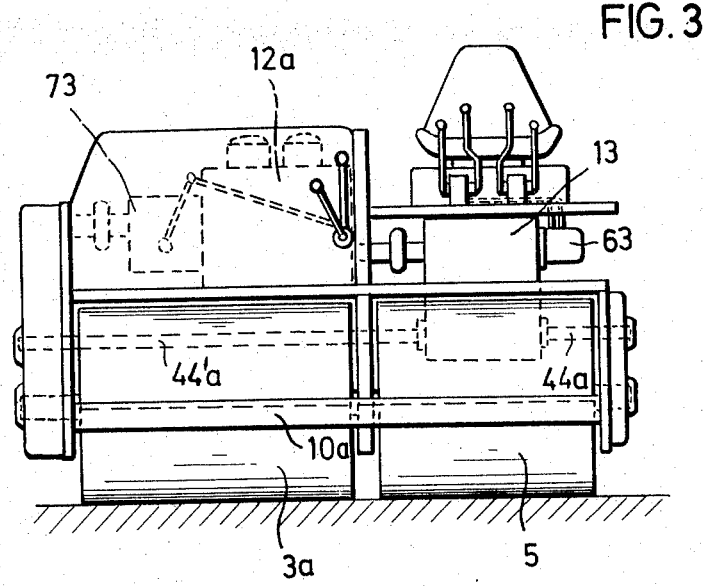
FIG. 3 is a front elevation view in diagrammatic form of a roller type vehicle shown in combination with the steering transmission of the present invention.
Figure 4:
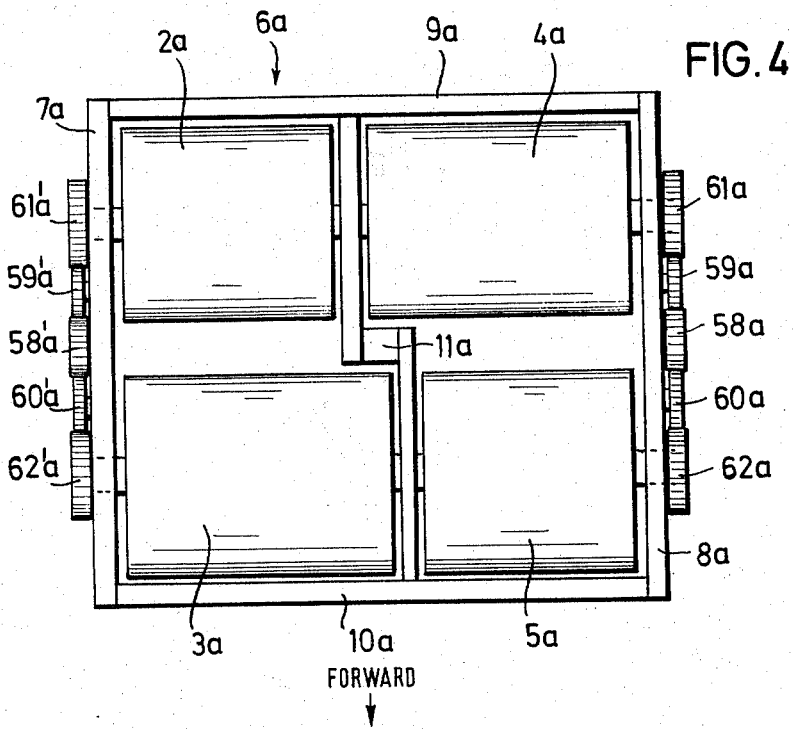
FIG. 4 is a plan view in a diagrammatic form of the vehicle shown in FIG. 3.

In FIGS. 3 and 4 another vehicle embodiment of this invention is shown. The roller type vehicle includes four rollers 2a, 3a, 4a, 5a which are generally driven in pairs arranged longitudinally on pach side of the vehicle. Each pair of rollers includes a narrow and a wide roller which are arranged in staggered relation with the corresponding width of the opposite roller pair. As shown in FIG. 4 the widths of the rollers overlap so that a seam in the rolled surface due to the inner edges of roller pairs is eliminated. Each roller pair 2a, 3a and 4a, 5a are driven independently in similar fashion as shown in FIGS. 1 and 2. A gear driven train 58a, 59a, 60a, 61a, 62a drives the roller pair 4a, 5a. A similar gear driven train 58a', 59a', 60a', 61a', 62a', drives the opposite roller pair 2a, 3a. Positioned on the vehicle is a driven engine 12a interconnected by a coupling 2, with the steering transmission 13. Independent drive shafts 44a and 44a' extend transversely from the transmission 13 to drive the pinions 58a, 58a' respectively.

The rollers which are normally used to compact the support surface can be of the vibratory type. When this arrangement is desired, a power take-off 73 is provided on the opposite end of the engine 12a for driving the vibration apparatus of the individual rollers 2a, 3a, 4a, 5a.

Figure 6:
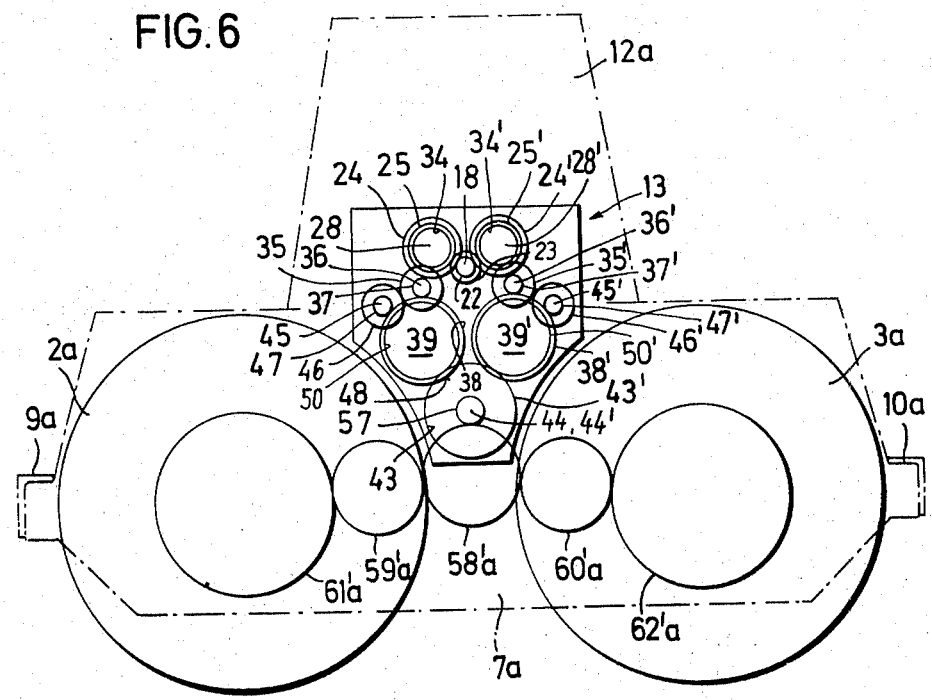
FIG. 6 shows a side elevation view in diagrammatic form of the steering transmission apparatus and vehicle of FIG. 3, illustrating the arrangement of the gear shafts relative to each other.

As shown diagrammatically in FIG. 6, the engine 12a and the transmission 13 are positioned transversely to the longitudinal axis of the vehicle. The transmission can thus be positioned in the space between the rollers allowing a direct gear drive arrangement and utilizing the available space between the rollers, thus providing a compact vehicle. This arrangement also provides that the vibration devices for each of the rollers may be driven directly from the single drive enging 12a.

As shown in FIGS. 7—11 the transmission 13 includes a housing 14 with end walls 15, 16 and removable upper cover plate 17. The input driven shaft 18 is connected to the engine 12 or 12a by means of a resilient clutch or coupling 19. The shaft 18 is rotatably mounted in the end walls 15, 16 of the housing 14 by bearings 20, 21. Spur gears 22, 23 having different diameters are drivingly connected to the shaft 18. Spur gear 22 meshes with gear 24 while gear 23 meshes with gear 25. The spur gears 24, 25 are mounted for rotational movement with respect to coupling shaft 28 by means of anti-friction bearings 26, 27. The coupling shaft 28 is rotatably mounted in the housing by bearings 29, 30. The drive gears 24, 25 are individually coupled to and uncoupled from the shaft 28 by means of respective clutches or coupling 31, 32. Both of the driven portions of the clutches 31, 32 are drivingly connected to the shaft 28 by means of a feather key 33. On one end of the coupling shaft 28 is mounted the driven gear 34 which in turn meshes with the gear 35.

Figure 8:
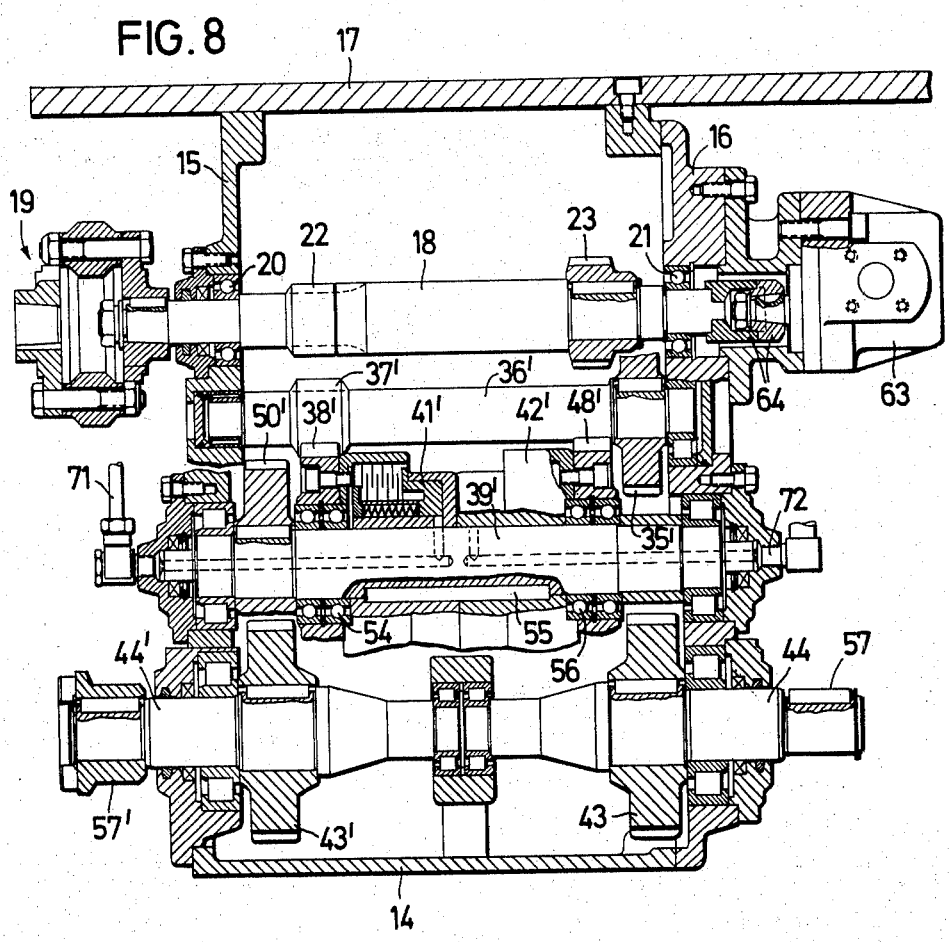
FIG. 8 shows a section view through the transmission apparatus taken along the line VIII—VIII of FIG. 7.
Figure 9:
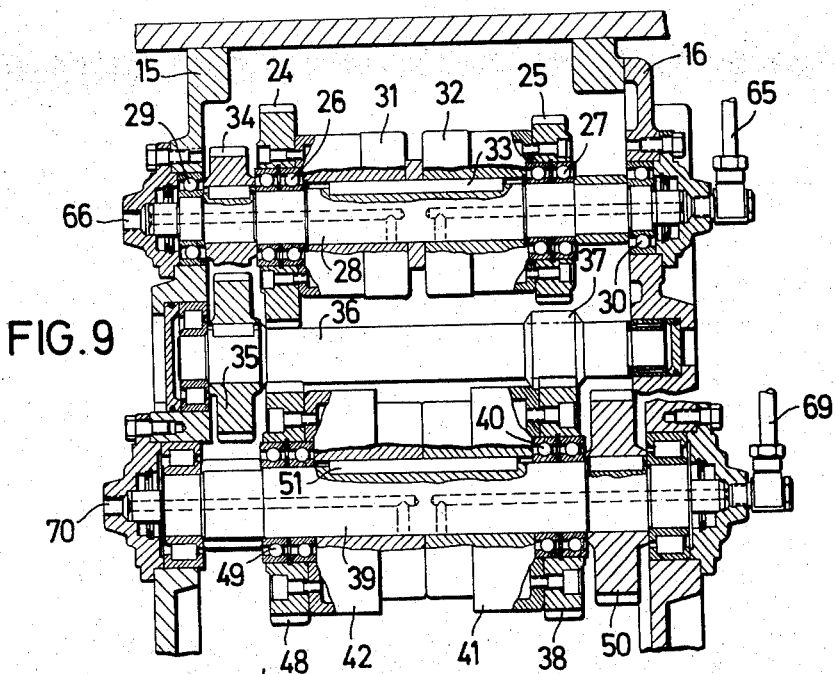
FIG. 9 shows a section view taken along the line IX—IX of FIG. 7.

The gear 35 is mounted for rotational movement on forward gear shaft 36. It is to be understood that all of the power transmission shafts disclosed herein are mounted in the housing by means of suitable bearing means. A spur gear 37 which is mounted on the forward gear shaft 36 meshes with gear 38 mounted by means of anti-friction bearings 40 on coupling shaft 39. A coupling or clutch 41 is provided for drivingly connecting the gear 38 with the shaft 39. Also mounted on the coupling shaft 39 is the drive gear 50 which meshes with gear 43 mounted on drive shaft 44. (FIGS. 8 and 9)

Also mounted on the forward gear shaft 36 is gear 35 which meshes with gear 46 mounted on shaft 45. A gear 47 which is of smaller diameter than the gear 46 is also mounted on the shaft 45 and meshes directly with the teeth of gear 48. The gear wheel 48 is mounted for rotational movement with respect to the coupling shaft 39 by means of anti-friction bearing 49. The gear 48 can be secured to the shaft 39 by means of the clutch or coupling 42 as desired. The corresponding driven portion of each of the clutches 41, 42 are secured to the shaft 39 by means of feather key 51. The coupling shaft 39 can be selectively rotated by engaging or coupling the clutches 41 or 42. Depending upon which clutch 41 or 42 is engaged with the coupling shaft 39, the reverse gear shaft 45 can be interconnected so that the drive shaft 44 is driven in the opposite direction for reverse travel, if desired.

The above described gear train arrangement thus affords a coupling branch for driving the driven shaft 44 for either forward travel or reverse travel at one of two speeds.

Figure 5:
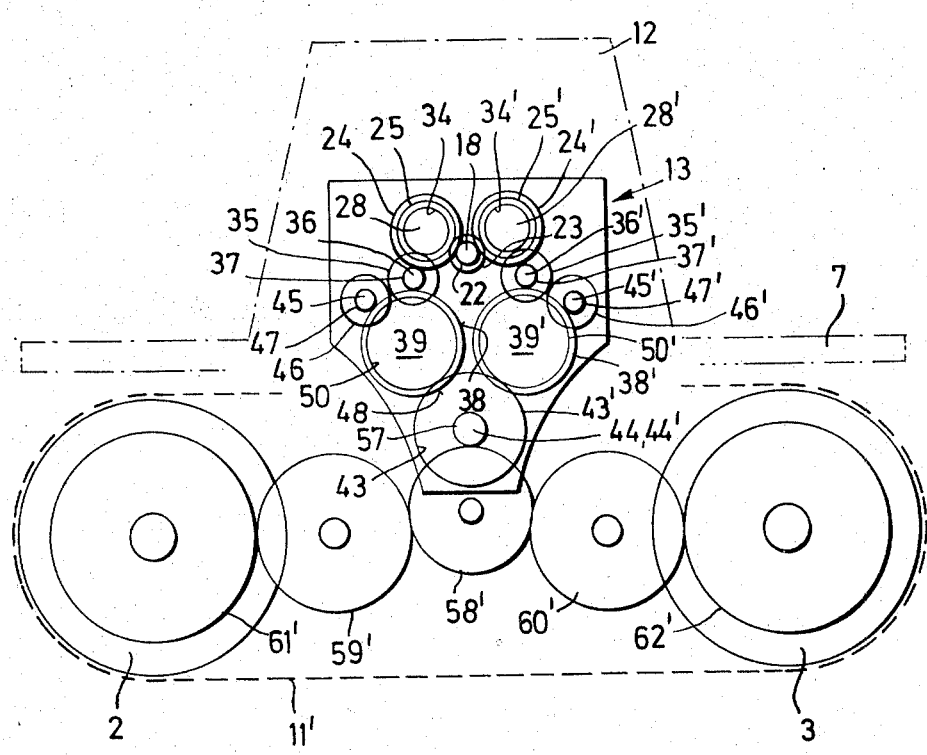
FIG. 5 shows a side elevation view in diagrammatic form of the vehicle and steering transmission apparatus of FIGS. 1 and 2, illustrating the arrangement of the gear shafts relative to each other.

In a similar manner a second gear train branch is obtained by simultaneously meshing gear 24' with the gear 22 and 25' with gear 23. Thus, gear wheels 22, 23, which are drivenly mounted on input drive shaft 18, simultaneously and respectively mesh and drive the gears 24, 24' and 25, 25'. The driven gears 24' and 25' are mounted for rotational movement with respect to the coupling shaft 28' by means of anti-friction bearings 52a and 52b respectively. Separate clutches 31' and 32' respectively connect the driven gears 24' or 25' to the coupling shaft 28'. The driven portion of the clutches 31', 32' are connected to the shaft 28' by means of feather key 53. Disposed on the coupling shaft 28' is spur gear 34' which is directly meshed with gear wheel 35'. The gear 35' is mounted on a second forward gear shaft 36' (FIG. 5). Mounted on the second forward gear shaft 36' is a gear 37' which meshes with gear 38'. The gear 38' is mounted for rotational movement relative to coupling shaft 39' by means of anti-friction bearing 54. The rotational connection of the gear 38' with respect to the coupling shaft 39' may be obtained by means of clutch 41'. Also mounted on the coupling shaft 39' by means of rotational bearings 56 and clutch 42 is gear 48'. The driven portion of the couplings 41', 42' are drivingly connected to the shaft 39' by means of feather key 55.

Also mounted on the coupling shaft 39' is gear wheel 50' positioned to engage gear 43'. The gear 43' is mounted in a driving connection to drive shaft 44'.

Figure 7:
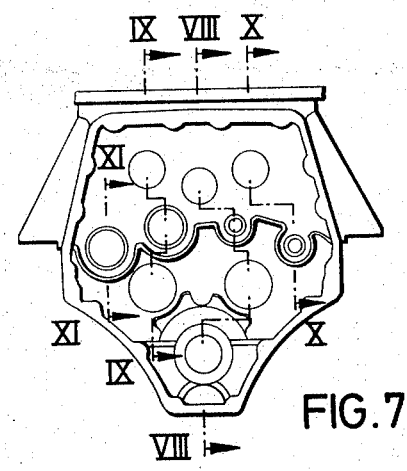
FIG. 7 shows a diagrammatic end view of the steerable transmission apparatus showing the relative position of the shafts with respect to each other similar to the view of FIGS. 5 and 6.

Also arranged in this second gear train is a second back or reverse gear shaft 45' for reversing the direction of rotation of the drive shaft 44' (FIG. 7). For this purpose, gear 35' meshes with gear 46' mounted on the reverse gear shaft 45'. The smaller diameter gear 47' rotates simultaneously with the shaft 45' and is meshed with the gear 48'. The gear 48' as explained above is operatively connected to the coupling shaft 39' through clutch 42. It is seen that the parallel gear train driving the drive shaft 44' can by appropriate clutch actuation be selectively driven forward or backward in either of two speeds.

The shafts 43' and 44' as shown in this embodiment are aligned longitudinally so that the drive connections on each side of the transmission housing can be independently controlled and operated to systematically drive separate members such as the drive wheel pairs or roller pairs described above. At the ends of the drive shaft 44, 44' are mounted pinion gears 57, 57' respectively. These pinion gears as illustrated in FIGS. 5 and 6 are drivingly connected to the drive gears 58, 58' or 58a, 58a'.

The engageable couplings or clutches are described in this embodiment as being of the hydraulic type. By the introduction of hydraulic pressure to the actuation plate of each clutch, a direct driven connection is obtained between the respective gear and shaft.

Hydraulic pump 63 is shown mounted on the side 16 of the housing 14 and directly connected to the input drive shaft 18 by means of a coupling or socket 64. Thus, hydraulic pressure for actuating of the clutches and control of the vehicle is obtained automatically when power is obtained from the engine 12 or 12a. The hydraulic pump 63 as shown herein is of the gear wheel type but can be of any type desired.

Figure 10:
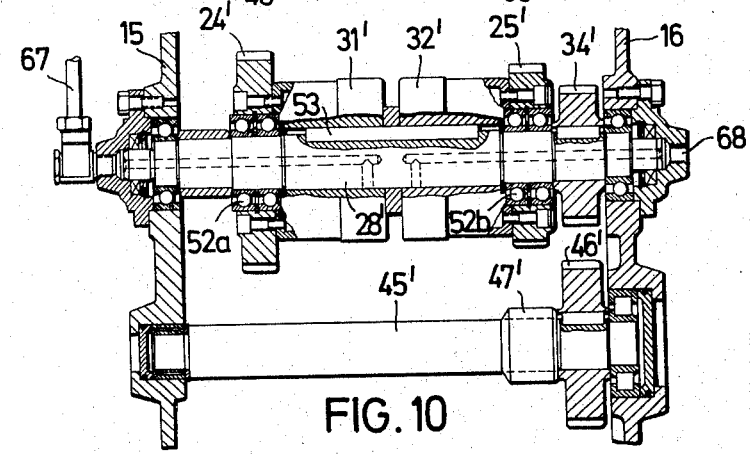
FIG. 10 shows a section view taken along the line X—X of FIG. 7.
Figure 11:
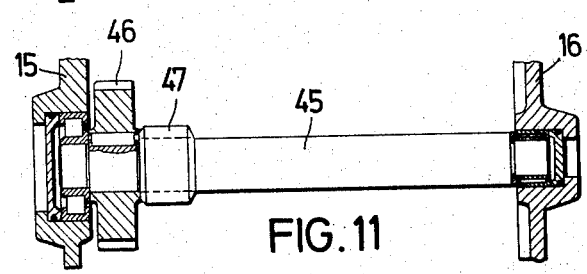
FIG. 11 shows a section view taken along the line XI—XI of FIG. 7.

Hydraulic pressure for actuation of the individual couplings is transmitted from the pump 63 by means of conduits 65, 66, 67, 68, 69, 70, 71, 72. The conduits are connected directly to the ends of the respective coupling shafts. Each shaft has central bores or holes drilled from each end partially the length of the shaft whereby the pressure medium may be fed to the individual respective clutches (FIGS. 8, 9 and 10). Hydraulic valves (not shown) are mounted in series with the respective conduits to selectively control the clutch actuation. These valves may be mounted in any desired location such as on the external surface of the upper transmission plate 17. If desired, one double-acting hydraulic control valve may be connected to the conduits of two clutches disposed on a single common shaft. The control lever can be moved from a neutral position to either one or the other of the clutch actuation positions. With this arrangement, only half the number of control levers relative to the number of clutches are required. The control levers may be arranged in accordance with their displacement to align with the desired direction of travel.

OPERATION

In the vehicles described herein which include the steering transmission apparatus described above, various movements can be effected by proper clutch actuation. For forward travel of the vehicle in first gear or low speed (in the direction of the arrows in FIGS. 1 and 3), the clutches 31 and 31' and 41 and 41' are energized or engaged. For reverse travel in the first speed, the clutches 31 and 31' and 42 and 42' are to be engaged.

If it is desired that the vehicle is to travel forward at a second speed, the clutches 32 and 32' as well as 41 and 41' are to be engaged. In a like manner in the case of reverse travel in the second speed, the clutches 32 and 32' as well as 42 and 42' are engaged.

A vehicle of the present invention can rotate or turn "on the spot" when it may be necessary. For forward travel in a right turn it is necessary to engage clutches 31, 31' and 41, 42'. If it is desired to perform this maneuver in the reverse direction, in other words in a right turn backwards, it is only necessary to engage clutches 31, 31', 42 and 41'. For rotating "on the spot" in the forward direction and towards the left, clutches 31, 31', 42 and 41' are engaged. A reverse movement towards the left requires the engagement of clutches 31, 31', 41 and 42'.

With the steering transmission as described in this invention, it is possible for the vehicle to travel along a curved path by driving one of the drive shafts 44, 44' at a higher speed than the other. For traveling on curves towards the right in a forward direction the clutches 32, 31', 41 and 41' must be engaged. As can be seen, the right hand pair of drive wheels (looking towards the front of the vehicle) rotate at a lower speed than the left hand pair. For traveling in a curve towards the right in a reverse direction, the clutches 32, 31' and 42, 42' must be kept engaged.

In a like manner, if it is desired to travel in a forward direction while curving towards the left, it is necessary that the right hand pair of drive wheels travel at a higher speed than the left hand pair; therefore, for a forward curve towards the left clutches 32', 31, 41' and 41 must be energized or engaged. For a similar curve but in the reverse direction, the clutches 32', 31, 42' and 42 must be engaged.

Irrespective of the speed or direction of travel of a vehicle incorporating the above steering transmission apparatus, it is found that the drive wheels or rollers are always directly connected by the gear drive. With this arrangement, the steering of the vehicle is accurately controlled, particularly with respect to turns or curves in either the forward or reverse direction. If desired, the transmission can be designed to include additional speed gears, thus providing a third, fourth, or more speed capability to the vehicle. By this addition, turns of various radii can be accomplished by varying the ratio of speeds from one side to the other. It is further pointed out that the drive wheels or rollers are always being driven so that no slipping or sliding with respect to the surface or pavement is possible.

The gearing arrangements which have been described for the present steering transmission allow the unit to be designed in a small and compact fashion. Only spur gears are used throughout this device and these gears are constantly meshed or engaged. There is no shifting or meshing of gears as is found in the conventional transmission. The gears together with the clutches and shafts form a structurally rigid unit. The clutches require no separate space but are disposed directly on the coupling shafts in the normally "dead" space usually present between the gears.

As mentioned above, the compact transmission apparatus as described herein is ideally suited for use in a roller vehicle as shown in FIGS. 3 and 4 due to the fact that the transmission can be shaped to fit into the space between a pair of rolls. With this arrangement the transmission can be positioned at a relatively low level with respect to the roller axles, thus minimizing the interconnecting drive gearing necessary for the transmission of power to the rolls.

The steering transmission described herein is suitable for all types of vehicles having drive wheels, tracks, rollers or the like which are rigidly mounted on the frame. In addition, it is also possible to use this transmission on boats, such as ferry boats, which have at least one propulsion screw on each side of the centerline. With the instant steering transmission it is thus possible to greatly improve the maneuverability of the boat by means of the independently controlled propellers.

While the transmission apparatus and its combination with various vehicles has been described in detail, it is obvious that this invention is not to be considered as being limited to the exact form or use disclosed and that changes in detail and construction may be made therein within the scope of this invention without departing from the spirit thereof.

I claim:

1. In a roller-type vehicle including a frame, an engine supported on said frame, and a pair of compacting rollers supported on each of two opposite sides of said frame and mounted for rotation about parallel axes,
   a. the improvement comprising compact transmission means for transmitting power from said engine to each of said pairs of rollers, said transmission means comprising:
   b. a housing,
   c. an input shaft journaled in said housing operatively connected to said engine, and
   d. first and second gear trains, each of said gear trains comprising
   e. a forward shaft journaled in said housing, a first pair of spur gears of different diameters fixed to said forward shaft, means for transmitting power from said input shaft to said forward shaft,
   f. a reverse shaft journaled in said housing in spaced relation to said forward shaft, a second pair of spur gears of different diameter fixed to said reverse shaft,
   g. one of said spur gears of said first pair on said forward shaft being in constant mesh with one of said spur gears of said second pair on said reverse shaft,
   h. a coupling shaft journaled in said housing in spaced relation to both said forward and reverse shafts, a third pair of spur gears of different diameters rotatably mounted on said coupling shaft, one of said spur gears of said third pair being in constant mesh with the other of said spur gears of said first pair on said forward shaft and the other of said spur gears of said third pair being in constant mesh with the other of said spur gears of said second pair on said reverse shaft, an additional spur gear fixed on said coupling shaft,
   i. an output shaft journaled in said housing in spaced relation to said coupling shaft and drivingly coupled to one of said pairs of rollers, a single spur gear fixed on said output shaft and in constant mesh with said additional spur gear on said coupling shaft, and
   j. clutch means for individually coupling and uncoupling each of said rotatably mounted spur gears of said third pair to and from said coupling shaft,
   k. whereby each of said pairs of rollers may be driven independently of the other pair of rollers in both forward and reverse directions.

2. In a roller-type vehicle including a frame, an engine supported on said frame, and a pair of compacting rollers supported on each of two opposite sides of said frame and mounted for rotation about parallel axes,
   a. the improvement comprising compact transmission means for transmitting power from said engine to each of said pairs of rollers, said transmission means comprising:

b. a housing, c. an input shaft journaled in said housing operatively connected to said engine, a first pair of spur gears having different diameters fixed on said input shaft within said housing, and d. first and second gear trains, each coupling said first pair of spur gears to one of said pair of rollers, each of said gear trains comprising e. a coupling shaft journaled in said housing in spaced relation to said input shaft, a second pair of spur gears having different diameters rotatably mounted on said coupling shaft, one of said spur gears of said second pair being in constant mesh with one spur gear of said first pair and the other of said spur gears of said second pair being in constant mesh with the other spur gear of said first pair, a further spur gear fixed on said coupling shaft, f. a forward shaft journaled in said housing in spaced relation to said coupling shaft, a third pair of spur gears of different diameters fixed to said forward shaft, g. a reverse shaft journaled in said housing in spaced relation to said forward shaft, a fourth pair of spur gears of different diameters fixed to said reverse shaft, h. one of said spur gears of said third pair on said forward shaft being in constant mesh with both said further spur gear on said coupling shaft and one of said spur gears of said fourth pair on said reverse shaft, i. a further coupling shaft journaled in said housing in spaced relation to both said forward and reverse shafts, a fifth pair of spur gears of different diameters rotatably mounted on said further coupling shaft, one of said spur gears of said fifth pair being in constant mesh with the other of said spur gears of said third pair on said forward shaft and the other of said spur gears of said fifth pair being in constant mesh with the other of said spur gears of said fourth pair on said reverse shaft, an additional spur gear fixed on said further coupling shaft, j. an output shaft journaled in said housing in spaced relation to said further coupling shaft and drivingly coupled to one of said pairs of rollers, a single spur gear fixed on said output shaft and in constant mesh with said additional spur gear on said further coupling shaft, and k. clutch means for individually coupling and uncoupling each of said rotatably mounted spur gears of said second and fifth pairs to and from their respective coupling shafts, l. whereby each of said pairs of rollers may be driven independently of the other pair of rollers at two different speeds in both the forward and reverse directions.

3. A vehicle as defined in claim 2 wherein each of said rollers includes vibration means whereby each roller is vibrated, said vibration means being driven by said engine.

4. A vehicle as defined in claim 2 wherein the rollers of each pair are of different lengths, the space between the rollers of one pair being staggered with respect to the space between the rollers of the other pair.

5. A vehicle as defined in claim 2 wherein said clutch means comprises an hydraulically operated clutch associated with each of said rotatably mounted spur gears of said second and fifth pairs for independently coupling and uncoupling said rotatably mounted spur gears to and from their respective coupling shafts, said transmission means further comprising a source of hydraulic power, conduit means between said hydraulic power source and each of said clutches and valve means for controlling hydraulic power to each of said clutches.

6. A vehicle as defined in claim 5 wherein said valve means comprises two double acting valves, each for controlling a pair of clutches for coupling and uncoupling one of said second and fifth pairs of spur gears rotatably mounted on said respective coupling shafts.

* * * * *